United States Patent
Keskin et al.

(10) Patent No.: US 11,636,319 B2
(45) Date of Patent: Apr. 25, 2023

(54) ITERATIVE NORMALIZATION FOR MACHINE LEARNING APPLICATIONS

(71) Applicant: Intel Corporation, Santa Clara, CA (US)

(72) Inventors: Gokce Keskin, Mountain View, CA (US); Anil Thomas, San Ramon, CA (US); Oguz Elibol, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1200 days.

(21) Appl. No.: 16/108,817

(22) Filed: Aug. 22, 2018

(65) Prior Publication Data
US 2019/0042927 A1    Feb. 7, 2019

(51) Int. Cl.
*G06N 3/063* (2006.01)
*G06N 3/08* (2006.01)
*G06N 3/04* (2006.01)
*G06F 17/16* (2006.01)
*G10L 15/16* (2006.01)
*G06N 3/088* (2023.01)

(52) U.S. Cl.
CPC ............ *G06N 3/063* (2013.01); *G06F 17/16* (2013.01); *G06N 3/0481* (2013.01); *G06N 3/088* (2013.01); *G10L 15/16* (2013.01)

(58) Field of Classification Search
CPC ........ G06F 17/16; G06N 3/04; G06N 3/0481; G06N 3/063; G06N 3/08; G06N 3/088; G10L 15/16
See application file for complete search history.

(56) References Cited

U.S. PATENT DOCUMENTS

| | | | | |
|---|---|---|---|---|
| 2011/0145675 | A1* | 6/2011 | Katayama | H03M 13/6577 714/752 |
| 2011/0257950 | A1* | 10/2011 | Kirby | G06F 17/175 703/2 |
| 2013/0246496 | A1* | 9/2013 | Craske | G06F 9/30036 708/495 |
| 2019/0228301 | A1* | 7/2019 | Thorson | G06N 3/0481 |

(Continued)

FOREIGN PATENT DOCUMENTS

| | | | |
|---|---|---|---|
| WO | 2016186813 A1 | 11/2016 | |
| WO | WO-2016186813 A1 * | 11/2016 | ............... G06N 5/04 |
| WO | 2018139266 A1 | 8/2018 | |

(Continued)

OTHER PUBLICATIONS

Lian, Ruo Long. A framework for FPGA-based acceleration of neural network inference with limited numerical precision via high-level synthesis with streaming functionality. University of Toronto (Canada), 2016: i-103 (Year: 2016).*

(Continued)

*Primary Examiner* — Kamran Afshar
*Assistant Examiner* — Randall K. Baldwin
(74) *Attorney, Agent, or Firm* — Jordan IP Law, LLC

(57) ABSTRACT

An embodiment of a semiconductor package apparatus may include technology to process one or more vectors with a sum of squares operation with a layer of a multi-layer neural network, and determine a fixed-point approximation for the sum of squares operation. Other embodiments are disclosed and claimed.

25 Claims, 7 Drawing Sheets

(56) References Cited

U.S. PATENT DOCUMENTS

2019/0339939 A1* 11/2019 Ito .......................... G06F 7/507

FOREIGN PATENT DOCUMENTS

WO          2018140294 A1    8/2018
WO    WO-2018140294 A1 * 8/2018       ............. G06N 3/063

OTHER PUBLICATIONS

Ioffe et al., "Batch Normalization: Accelerating Deep Network Training by Reducing Internal Covariate Shift", arxiv.org/pdf/1502.03167.pdf, Mar. 2, 2015, 11 pages.
Roy, S.C. Dutta, "Approximating the Square Root of the Sum of Two Squares", tandfonline.com/doi/abs/10.1080/09747338.1991.11436322, Jun. 2, 2015, 2 pages.
Extended European Search Report European Patent Application No. 19183477.9 dated Feb. 3, 2020, 8 pages.
Denker et al., "Neural Network Models of Learning and Adaptation," Physica 22D, vol. 22, No. 1-3, Amsterdam, NL, Oct. 1, 1986, pp. 216-232.

* cited by examiner

ITERATIVE NORMALIZATION FOR MACHINE LEARNING APPLICATIONS

TECHNICAL FIELD

Embodiments generally relate to machine learning systems. More particularly, embodiments relate to iterative normalization for machine learning applications.

BACKGROUND

Multi-layer neural network technology has many applications, include machine learning applications. Examples of machine learning applications include CAFFE (a deep learning framework), THEANO (a library), APACHE SPARK™ (a multi-language engine) and MICROSOFT AZURE® (a cloud platform), all of which may utilize multi-layer neural network technology. Some multi-layer neural networks may include batch normalization technology.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
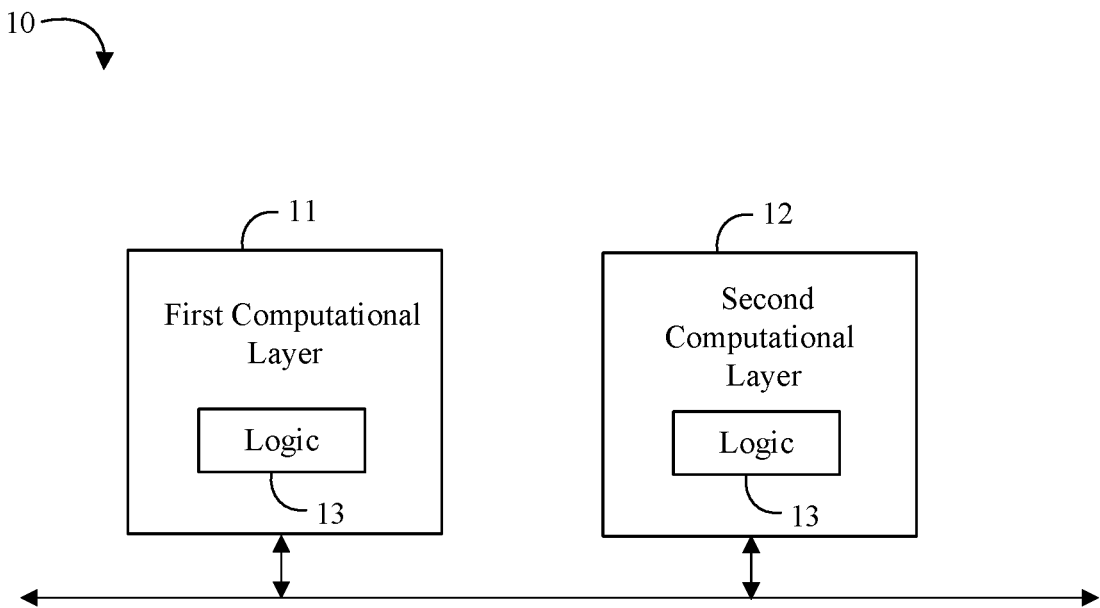
FIG. 1 is a block diagram of an example of an electronic processing system according to an embodiment.

Turning now to FIG. 1, an embodiment of a multi-layer neural network apparatus 10 may include a first computational layer 11, and a second computational layer 12 communicatively coupled to the first computational layer 11. One or more of the first and second computational layers 11, 12 may include logic 13 to process one or more vectors with a sum of squares operation, and determine a fixed-point approximation for the sum of squares operation. For example, the logic 13 may be further configured to provide overflow protection for the sum of squares operation. In some embodiments, the logic 13 may be further configured to provide batch normalization for the one or more vectors. For example, the logic 13 may be configured to accumulate a running value corresponding to a square root of the sum of squares operation. Some embodiments of the logic 13 may be further configured to determine a number of elements for the sum of squares operation based on a threshold value relative to a maximum fixed-point value, and accumulate the running value corresponding to a square root of the sum of squares operation based on the determined number of elements. In some embodiments, the logic 13 may include further technology to provide one or more of supervised and unsupervised learning for one or more of a speech processing application, an image processing, a pattern processing application, a machine learning application, etc. In some embodiments, the computational layers 11, 12 and/or the logic 13 may be located in, or co-located with, various components, including a processor, memory, an inference engine, etc. (e.g., on a same die).

Embodiments of each of the above computational layers 11, 12, logic 13, and other components of the apparatus 10 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON™ (a programming language), PERL (a programming language), JAVA™ (a programming language), SMALLTALK™ (a programming language), C++, C# or the like and conventional procedural programming languages, such as the "C" programming language or similar programming languages. For example, persistent storage media, or other memory may store a set of instructions which when executed by a processor cause the apparatus 10 to implement one or more components, features, or aspects of the apparatus 10 (e.g., the computational layers 11, 12, the logic 13, processing the vectors with the sum of squares operation, determining the fixed-point approximation for the sum of squares operation, etc.). Embodiments of a suitable processor may include a general purpose processor, a special purpose processor, a central processor unit (CPU), a controller, a micro-controller, a kernel, an execution unit, etc.

Figure 2:
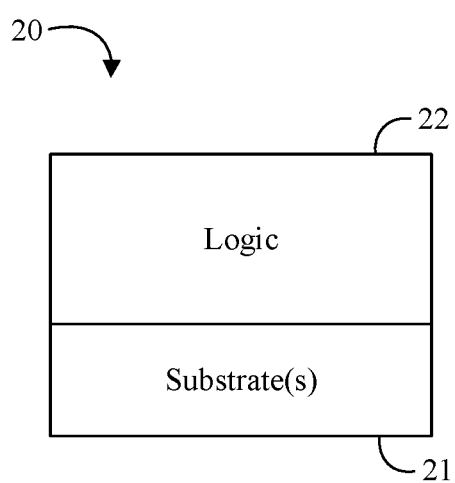
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to process one or more vectors with a sum of squares operation with a layer of a multi-layer neural network, and determine a fixed-point approximation for the sum of squares operation. For example, the logic 22 may be further configured to provide overflow protection for the sum of squares operation. In some embodiments, the logic 22 may be further configured to provide batch normalization for the one or more vectors. For example, the logic 22 may be configured to accumulate a running value corresponding to a square root of the sum of squares operation. Some embodiments of the logic 22 may be further configured to determine a number of elements for the sum of squares operation based on a threshold value relative to a maximum fixed-point value, and accumulate the running value corresponding to a square root of the sum of squares operation based on the determined number of elements. In some embodiments, the logic 22 may include further technology to provide one or more of supervised and unsupervised learning for one or more of a speech processing application, an image processing, a pattern processing application, a machine learning application, etc. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIG. 3), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3:
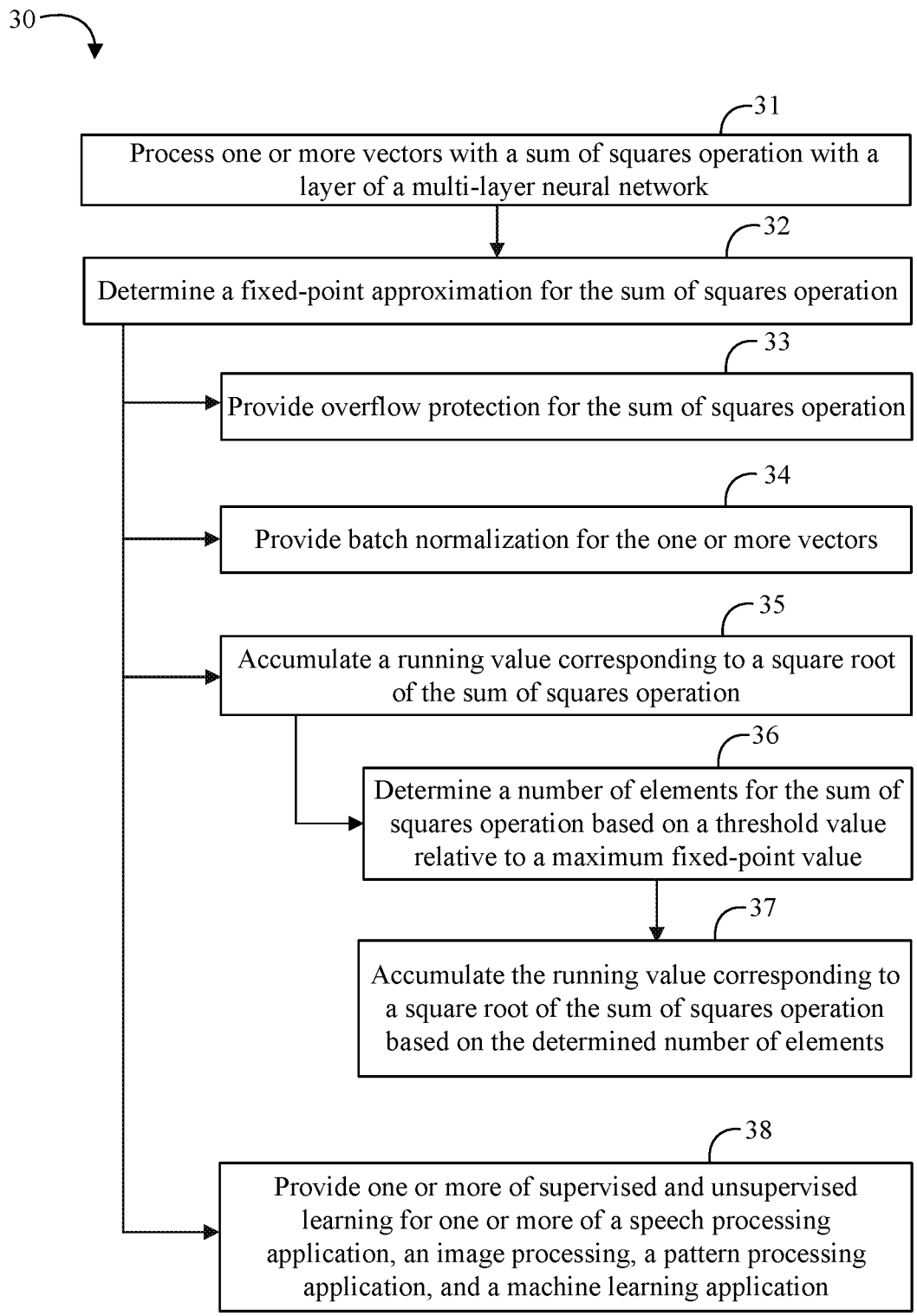
FIG. 3 is a flowchart of an example of a method of machine learning according to an embodiment.

Turning now to FIG. 3, an embodiment of a method 30 of machine learning may include processing one or more vectors with a sum of squares operation with a layer of a multi-layer neural network at block 31, and determining a fixed-point approximation for the sum of squares operation at block 32. For example, the method 30 may further include providing overflow protection for the sum of squares operation at block 33. Some embodiments of the method 30 may further include providing batch normalization for the one or more vectors at block 34. The method 30 may also include accumulating a running value corresponding to a square root of the sum of squares operation at block 35. For example, the method 30 may include determining a number of elements for the sum of squares operation based on a threshold value relative to a maximum fixed-point value at block 36, and accumulating the running value corresponding to a square root of the sum of squares operation based on the determined number of elements at block 37. In some embodiments of the method 30, the multi-layer neural network may include further technology to provide one or more of supervised and unsupervised learning for one or more of a speech processing application, an image processing, a pattern processing application, and a machine learning application at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
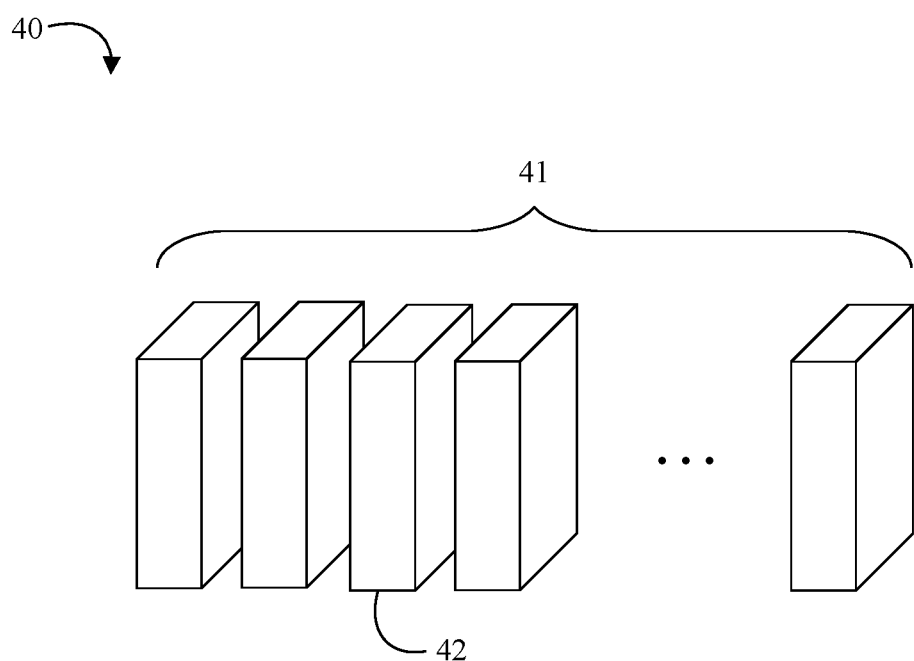
FIG. 4 is a block diagram of an example of a multi-layer neural network apparatus according to an embodiment.

Turning now to FIG. 4, an embodiment of a multi-layer neural network 40 may include two or more layers 41, where at least one of the layers includes complex computations implemented with fixed point approximations of the complex computations. In a conventional neural network such complex computation may either be performed with precision circuits (e.g., floating point arithmetic logic units, higher precision integer math/logic) or may overflow the fixed point logic circuits. Precision circuits may involve substantial additional circuitry and/or execution time (e.g., additional power and/or compute resources). Overflowing the fixed point logic may cause a fault in the operation. Advantageously, some embodiments may replace a complex computation with an appropriate approximation that can successfully be performed on the fixed point (e.g., integer) arithmetic logic or lower precision logic without overflowing. Utilizing lower precision fixed point arithmetic may utilize fewer compute resources (e.g., power, silicon area, etc.) as compared to higher precision units, and may allow deployment of a neural network in a less powerful computer system (e.g., a mobile device such as an edge device, a tablet, a smartphone, etc.).

For example, the multi-layer neural network 40 may include one or more batch normalization layers 42. Batch normalization may involve a sum of squares operation. Some embodiment may advantageously provide an iterative process for batch normalization to inhibit or prevent overflows in limited precision systems. For example, some embodiments may utilize an approximation to prevent overflows of sum of squares during a batch normalization operation in limited precision systems. Batch normalization in neural networks may involve the computation of the magnitude of vectors (e.g., the vector norm or "L2-norm" of vectors). In limited precision arithmetic, such a sum of squares operation could overflow beyond the numbers that can be represented in the system. Some embodiments may instead utilize an iterative process to calculate a running value for the square root of the sum of squares operation (e.g., the L2-norm computation that is used in batch normalization). Advantageously, some embodiments may avoid calculating large values (e.g., sum of squares) that may lead to overflow. In some embodiments, the approximation may limit the largest sum of squares values, which may advantageously help prevent overflows in batch normalization calculations for limited precision arithmetic. Some embodiments may advantageously utilize fixed point or flex point arithmetic for batch normalization (e.g., instead of floating point), which may provide power and/or performance advantages.

Embodiments of the layer(s) 41, the batch normalization layer(s) 42, and other components of the multi-layer neural network 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Batch normalization in neural networks may involve the computation of a L2-norm of vectors. In limited precision arithmetic, sum of squares operations could overflow beyond the numbers that can be represented in the system. If the vector x is represented as:

$$x=[x_1, x_2, \ldots, x] \quad [\text{Eq. 1}]$$

A straightforward way of calculating the L2-norm for this vector may be represented as:

$$\|x\|_2 = y_{(1,N)} = \sqrt{\Sigma_{i=1}^N x_i^2} \quad [\text{Eq. 2}]$$

where $y_{(1,N)}$ denotes the square root of the sum of squares for elements 1 through N. For large values of N, adding N of the squared $x_i$ elements could lead to overflow. For some applications, ultimately the square root of this sum may be needed, which is much smaller than the sum. Some embodiments may advantageously determine the small number (e.g., the square root) without having to calculate the larger sum of squares.

For example, some embodiments may determine an approximation for the smaller number without performing the intermediate calculations of the larger number. Any suitable approximation may be used, based on the particular application. For example, some embodiments may calculate the square root of the sum of squares of two numbers with the following approximation:

$$\sqrt{a^2+b^2} \approx a + \frac{b^2}{2a} \quad [\text{Eq. 3}]$$

with the condition that 0<b<0.5a. Under this condition, the error in the approximation is at most 0.64%. This error drops to about 0.02% when b/a=0.2.

Figure 5:
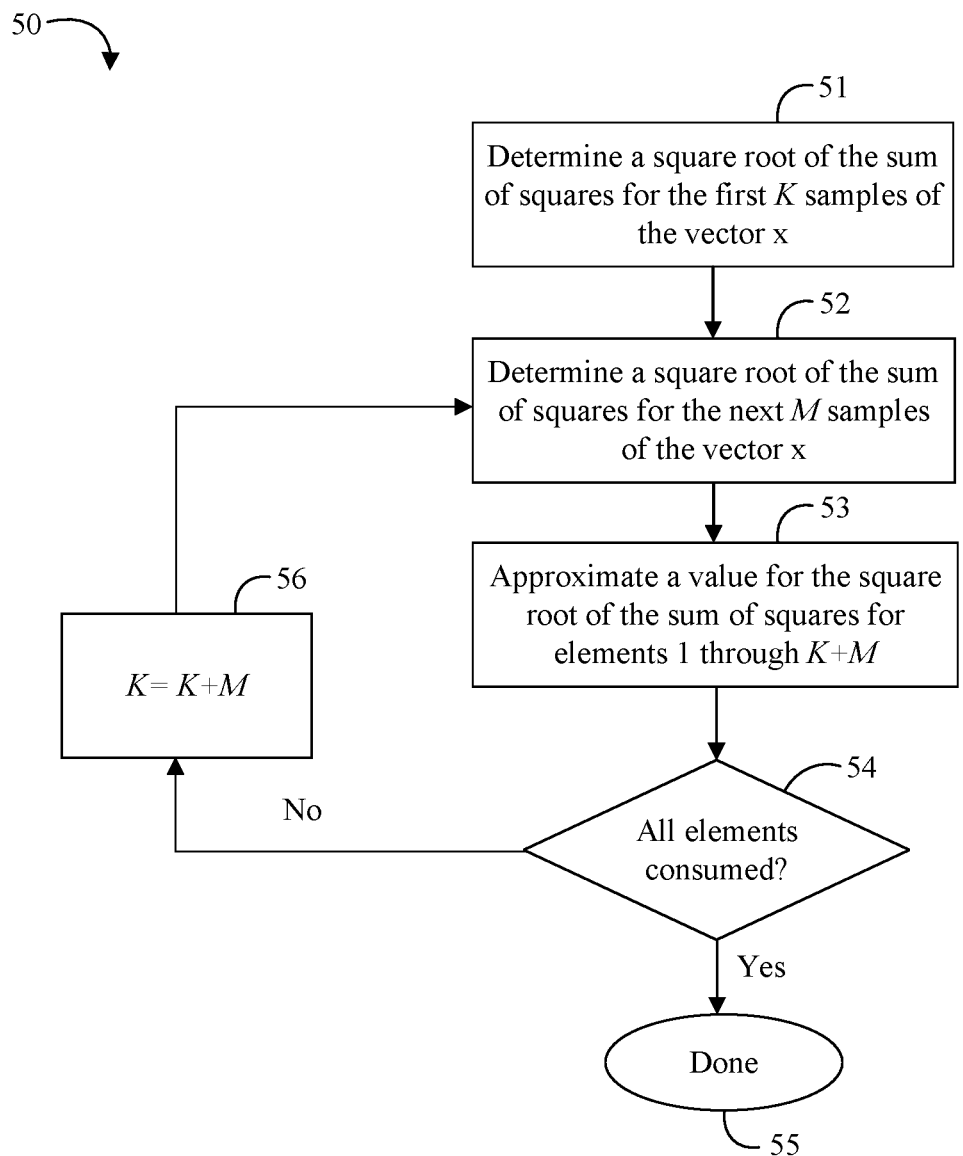
FIG. 5 is a flowchart of an example of a method of determining a vector norm according to an embodiment.

Turning now to FIG. 5, an embodiment of a method 50 of determining the L2-norm of the vector x with N elements may include determining a square root of the sum of squares for the first K samples of the vector x at block 51. For example, some embodiments may take the first K samples of the vector x, and calculate the square root of the sum squares for elements 1 through K utilizing fixed point processing as follows:

$$y_{(1,K)} = \sqrt{\Sigma_{i=1}^K x_i^2} \quad [\text{Eq. 4}]$$

Some embodiments may choose a value for K which is much less than N (K«N) so that the fixed point operation is unlikely to overflow. Alternatively, some embodiments may iteratively sum the squares until the square of the current element exceeds a threshold value. For example, if the maximum positive value that can be represented in the system is $A_{max}$, some embodiments may continue summing the $x_i^2$ elements until half of the maximum positive value is reached (e.g., threshold=$A_{max}/2$). The value for K may then be set to the position of the last element successfully summed.

The method 50 may then include determining a square root of the sum of squares for the next M samples of the vector x at block 52. For example, some embodiments may take the elements from K+1 through K+M for vector x, and calculate the square root of the sum squares for those elements utilizing fixed point processing as follows:

$$y_{(K+1,K+M)} = \sqrt{\Sigma_{i=K+1}^{K+M} x_i^2} \quad [\text{Eq. 5}]$$

where a value for M is selected to be small enough such that $y_{(K+1,K+M)}$ is unlikely to overflow, and $y_{(K+1,K+M)} < 0.5 y_{(1,K)}$. Alternatively, some embodiments may iteratively sum the squares until a condition is met. For example, some embodiments may continue summing M values until the condition $y_{(K+1,K+M)} \approx 0.2\, y_{(1,K)}$ is reached.

The method 50 may then include approximating a value for the square root of the sum of squares for elements 1 through K+M at block 53, based on the values determined at blocks 51 and 52. For example, instead of calculating the value $y_{(1,K+M)}$ as follows (e.g., which may involve summing two large numbers):

$$y_{(1,K+M)} = \sqrt{\Sigma_{i=1}^{K+M} x_i^2} = \sqrt{y_{(1,K)}^2 + y_{(K+1,K+M)}^2} \quad [\text{Eq. 6}]$$

Some embodiments may approximate the value as follows:

$$y_{(1,K+M)} = \sqrt{y_{(1,K)}^2 + y_{(K+1,K+M)}^2} \approx y_{(1,K)} + \frac{y_{(K+1,K+M)}^2}{2 y_{(1,K)}} \quad [\text{Eq. 7}]$$

Advantageously, some embodiments may determine an accurate approximation for $y_{(1,K+M)}$ while avoiding summing the squares of all numbers from 1 to K+M in one operation, which helps avoid overflows. Moreover, after calculating the two smaller sums of squares ($y_{(1,K)}^2$) and $y_{(K+1,K+M)}^2$, these two sum of squares are also not added directly (e.g., as they are in Eq. 6). Instead, an appropriate approximation (see Eq. 7) is utilized to help avoid overflow.

The method 50 may then determine if all elements have been consumed at block 54. If so, the method 50 may be done at block 55. Otherwise, the method 50 may set the value for K to be equal to K+M at block 56 (e.g., K=K+M), and the method 50 may return to block 52 to consume the next M elements of the vector x. For example, the previous value for $y_{(1,K+M)}$ may be iteratively utilized to determine the approximation for the next value of $y_{(1,K+2M)}$, until all N elements are consumed.

Some other systems may avoid overflow issues for complex computations in neural networks (e.g., sum of square operations) by performing those computations in a native higher precision mode (e.g., 48-bits vs. 16-bits). For matrix multiplications, the higher precision mode may result in significantly higher power consumption. In some architectures, using the higher precision mode may cause lower performance and/or higher power consumption. Some embodiments may advantageously utilize approximations for the complex computations, which may be performed in lower precision with higher performance and/or lower power consumption. In addition, some embodiments may improve or optimize memory traffic to retrieve elements of the vector to be batch normalized. For example, some architectures may utilize specialized kernels for complex computations (e.g., a batchnorm kernel) which involves memory intensive operations. Some embodiments may advantageously reduce the number of memory reads needed to complete a batch normalization operation.

For example, some implementations of a batch normalization kernel may require the calculation of mean (μ) and standard deviation (σ) of a minibatch of N samples x= $(x_1, \ldots, x_N)$, where σ is given by:

$$\sigma = \sqrt{\frac{1}{N}\sum_{i=1}^{N}(x_i - \mu)^2} \quad \text{[Eq. 8]}$$

The mean and variance calculation may result in three (3) memory operations including (1) reading all the current minibatch data $(x_1, \ldots, x_N)$ to calculate the mean μ; (2) read each value again to subtract the mean from each of these values $(x_i-\mu)$ and write the calculations back; and (3) read these values $(x_i-\mu)$, calculating the sum squares using the high precision calculation (48-bit values), and then calculating the variance σ. Some embodiments may calculate the square-root of sum squares, namely $y_{(1,N)}$, as the batch samples arrive. For example, the 3 step operation may be utilized because of the overflow risk in calculating of $y_{(1,N)}$ using the traditional approach. Because some embodiments may calculate $y_{(1,N)}$ as the batch samples arrive, only the first memory operation would be needed. The variance can then be calculated as:

$$\sigma = E[x^2] - (E[x])^2 = E[x^2] - \mu^2 \quad \text{[Eq. 9]}$$
$$= \left(\sqrt{E[x^2]} - \mu\right)\left(\sqrt{E[x^2]} + \mu\right)$$
$$= \left(\sqrt{\frac{1}{N}\sum_{i=1}^{N}x_i^2} - \mu\right)\left(\sqrt{\frac{1}{N}\sum_{i=1}^{N}x_i^2} + \mu\right)$$
$$= \left(\frac{y_{(1,N)}}{\sqrt{N}} - \mu\right)\left(\frac{y_{(1,N)}}{\sqrt{N}} + \mu\right)$$

For example, because $y_{(1,N)}$ may be calculated in an overflow-free way as the batch samples arrive, $\sigma^2$ may be computed at the end of the first memory read operation, resulting in a significant performance improvement.

Figure 6A:
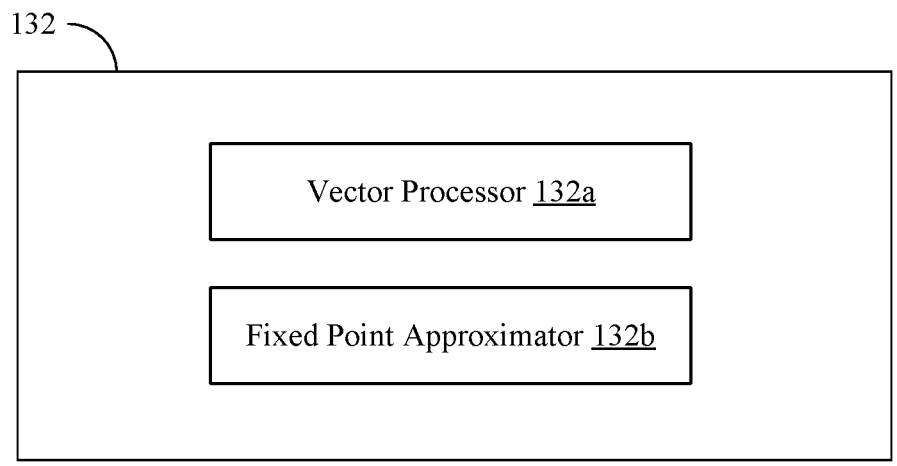
FIGS. 6A and 6B are block diagrams of examples of machine learning apparatuses according to embodiments.

FIG. 6A shows a machine learning apparatus 132 (132a-132b) that may implement one or more aspects of the method 30 (FIG. 3) and/or the method 50 (FIG. 5). The machine learning apparatus 132, which may include logic instructions, configurable logic, fixed-functionality hardware logic, may be readily substituted for the apparatus 10 (FIG. 1) and/or the apparatus 40 (FIG. 4), already discussed. A vector processor 132a may include technology to process one or more vectors, and a fixed point approximator 132b may include technology to determine a fixed-point approximation for a sum of squares operation on the one or more vectors (e.g., as a layer of a multi-layer neural network). For example, the fixed point approximator 132b may be further configured to provide overflow protection for the sum of squares operation. In some embodiments, the fixed point approximator 132b may be further configured to provide batch normalization for the one or more vectors. For example, the fixed point approximator 132b may be configured to accumulate a running value corresponding to a square root of the sum of squares operation. Some embodiments of the fixed point approximator 132b may be further configured to determine a number of elements for the sum of squares operation based on a threshold value relative to a maximum fixed-point value, and accumulate the running value corresponding to a square root of the sum of squares operation based on the determined number of elements. In some embodiments, the machine learning apparatus 132 may include further technology to provide one or more of supervised and unsupervised learning for one or more of a speech processing application, an image processing, a pattern processing application, a machine learning application, etc.

Figure 6B:
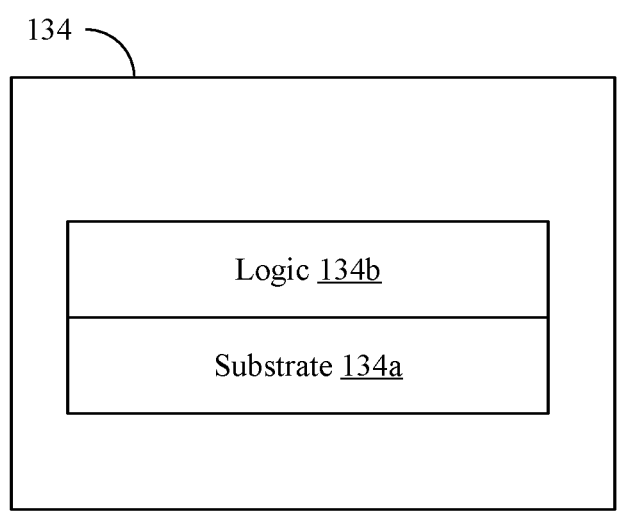

Turning now to FIG. 6B, machine learning apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIG. 3) and/or the method 50 (FIG. 5). Thus, the logic 134b may process one or more vectors with a sum of squares operation with a layer of a multi-layer neural network, and determine a fixed-point approximation for the sum of squares operation. For example, the logic 134b may be further configured to provide overflow protection for the sum of squares operation. In some embodiments, the logic 134b may be further configured to provide batch normalization for the one or more vectors. For example, the logic 134b may be configured to accumulate a running value corresponding to a square root of the sum of squares operation. Some embodiments of the logic 134b may be further configured to determine a number of elements for the sum of squares operation based on a threshold value relative to a maximum fixed-point value, and accumulate the running value corresponding to a square root of the sum of squares operation based on the determined number of elements. In some embodiments, the logic 134b may include further technology to provide one or more of supervised and unsupervised learning for one or more of a speech processing application, an image processing, a pattern processing application, a machine learning application, etc. In one example, the apparatus 134 is a semiconductor die, chip and/or package.

Figure 7:
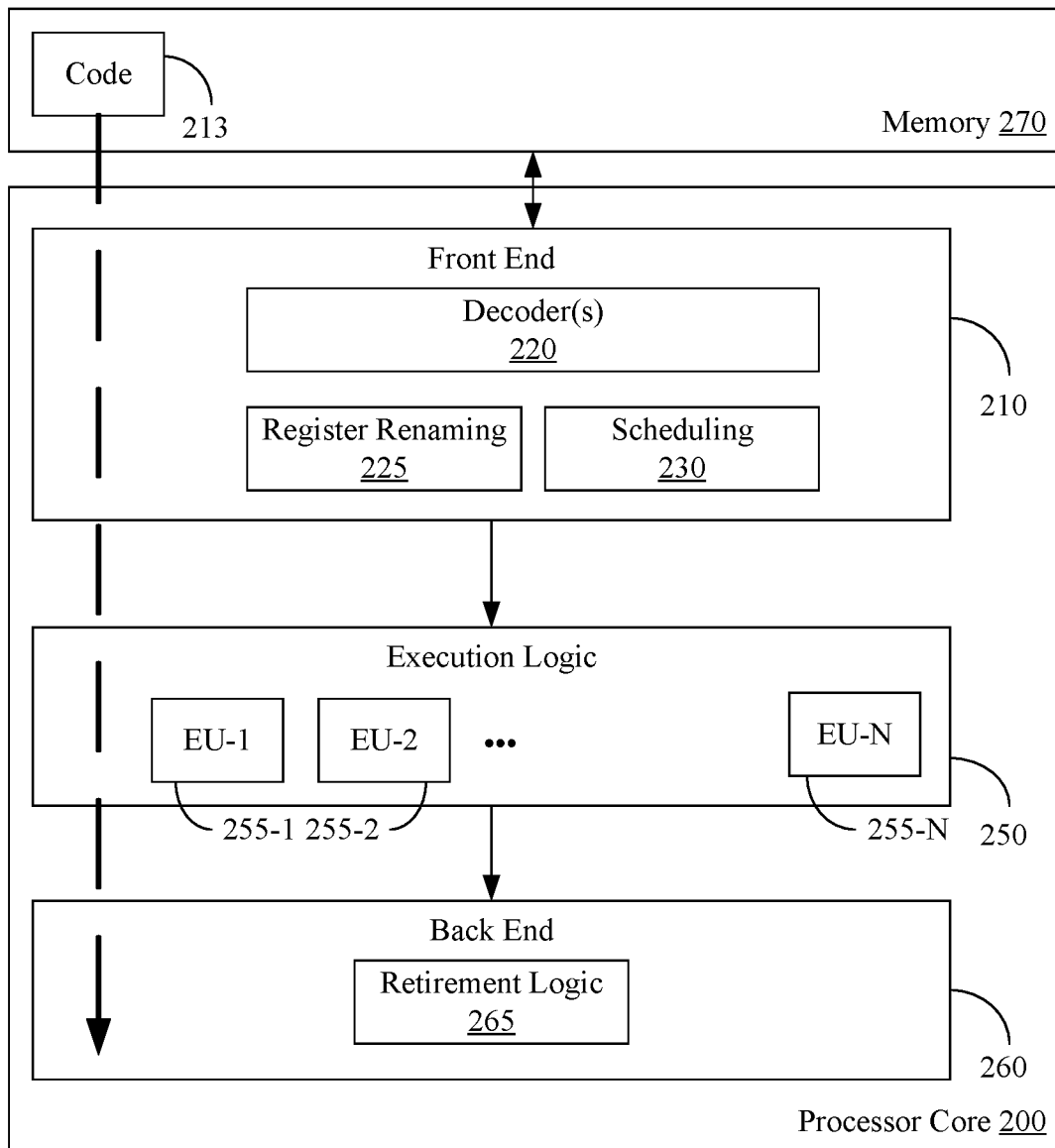
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 3) and/or the method 50 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
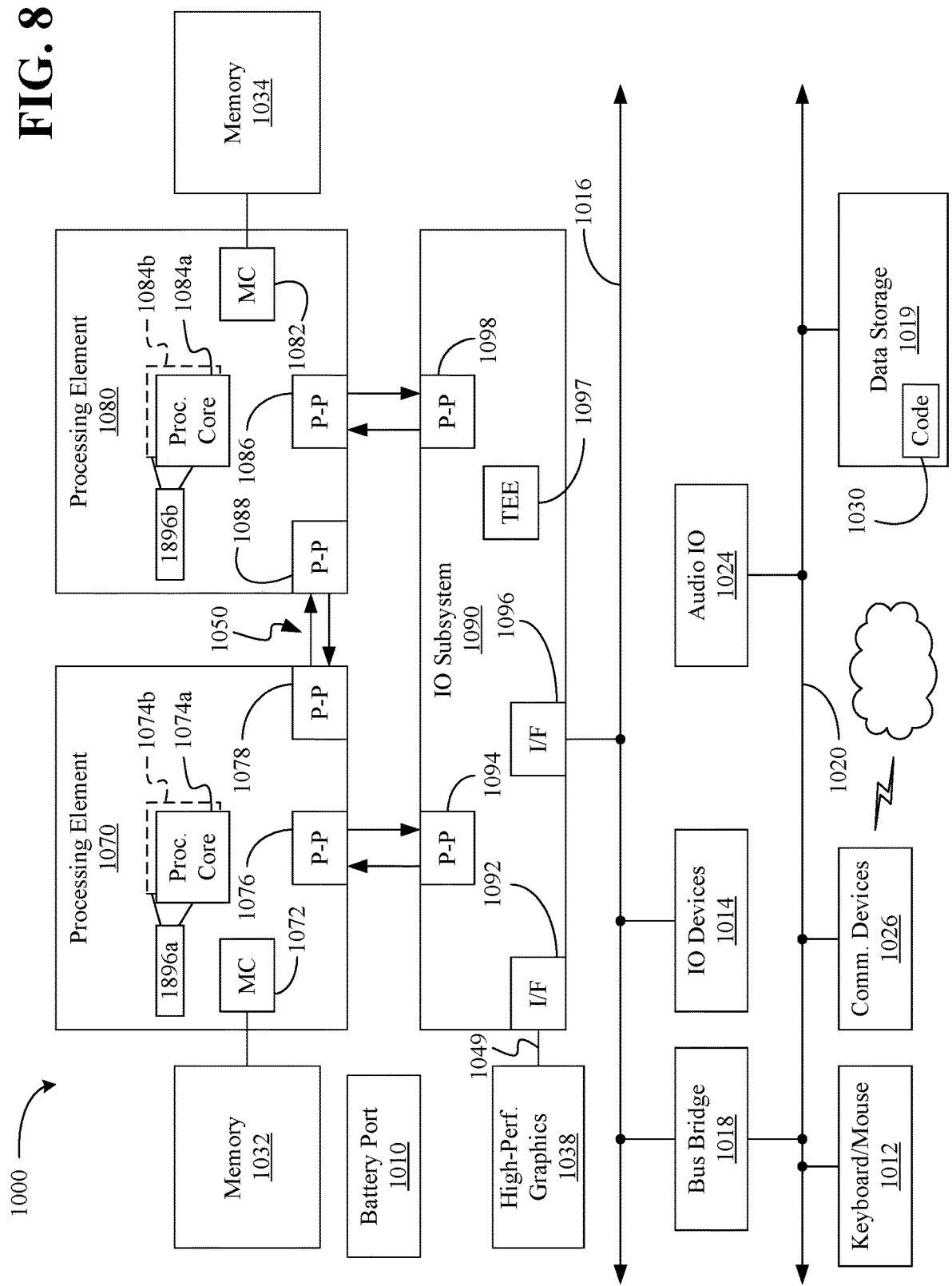
FIG. 8 is a block diagram of an example of a system according to an embodiment.

Referring now to FIG. 8, shown is a block diagram of a system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited. The system 1000 further includes a battery port 1010.

As shown in FIG. 8, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIG. 3) and/or the method 50 (FIG. 5), already discussed, and may be similar to the code 213 (FIG. 7), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology.

ADDITIONAL NOTES AND EXAMPLES

Example 1 may include a multi-layer neural network apparatus, comprising a first computational layer, and a second computational layer communicatively coupled to the first computational layer, wherein one or more of the first and second computational layers include logic to process one or more vectors with a sum of squares operation, and determine a fixed-point approximation for the sum of squares operation.

Example 2 may include the apparatus of Example 1, wherein the logic is further to provide overflow protection for the sum of squares operation.

Example 3 may include the apparatus of any of Examples 1 to 2, wherein the logic is further to provide batch normalization for the one or more vectors.

Example 4 may include the apparatus of any of Examples 1 to 3, wherein the logic is further to accumulate a running value corresponding to a square root of the sum of squares operation.

Example 5 may include the apparatus of Example 4, wherein the logic is further to determine a number of elements for the sum of squares operation based on a threshold value relative to a maximum fixed-point value, and accumulate the running value corresponding to a square root of the sum of squares operation based on the determined number of elements.

Example 6 may include the apparatus of any of Examples 1 to 5, wherein the logic is further to provide one or more of supervised and unsupervised learning for one or more of a speech processing application, an image processing, a pattern processing application, and a machine learning application.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to process one or more vectors with a sum of squares operation with a layer of a multi-layer neural network, and determine a fixed-point approximation for the sum of squares operation.

Example 8 may include the apparatus of Example 7, wherein the logic is further to provide overflow protection for the sum of squares operation.

Example 9 may include the apparatus of any of Examples 7 to 8, wherein the logic is further to provide batch normalization for the one or more vectors.

Example 10 may include the apparatus of any of Examples 7 to 9, wherein the logic is further to accumulate a running value corresponding to a square root of the sum of squares operation.

Example 11 may include the apparatus of Example 10, wherein the logic is further to determine a number of elements for the sum of squares operation based on a threshold value relative to a maximum fixed-point value, and accumulate the running value corresponding to a square root of the sum of squares operation based on the determined number of elements.

Example 12 may include the apparatus of any of Examples 7 to 11, wherein the multi-layer neural network is further to provide one or more of supervised and unsupervised learning for one or more of a speech processing application, an image processing, a pattern processing application, and a machine learning application.

Example 13 may include the apparatus of any of Examples 7 to 12, wherein the logic coupled to the one or more substrates includes transistor channel regions that are positioned within the one or more substrates.

Example 14 may include a method of machine learning, comprising processing one or more vectors with a sum of squares operation with a layer of a multi-layer neural network, and determining a fixed-point approximation for the sum of squares operation.

Example 15 may include the method of Example 14, further comprising providing overflow protection for the sum of squares operation.

Example 16 may include the method of any of Examples 14 to 15, further comprising providing batch normalization for the one or more vectors.

Example 17 may include the method of any of Examples 14 to 16, further comprising accumulating a running value corresponding to a square root of the sum of squares operation.

Example 18 may include the method of Example 17, further comprising determining a number of elements for the sum of squares operation based on a threshold value relative to a maximum fixed-point value, and accumulating the running value corresponding to a square root of the sum of squares operation based on the determined number of elements.

Example 19 may include the method of any of Examples 14 to 18, wherein the multi-layer neural network is further to provide one or more of supervised and unsupervised learning for one or more of a speech processing application, an image processing, a pattern processing application, and a machine learning application.

Example 20 may include at least one computer readable storage medium, comprising a set of instructions, which when executed by a computing device, cause the computing device to process one or more vectors with a sum of squares operation with a layer of a multi-layer neural network, and determine a fixed-point approximation for the sum of squares operation.

Example 21 may include the at least one computer readable storage medium of Example 20, comprising a further set of instructions, which when executed by the computing device, cause the computing device to provide overflow protection for the sum of squares operation.

Example 22 may include the at least one computer readable storage medium of any of Examples 20 to 21, comprising a further set of instructions, which when executed by the computing device, cause the computing device to provide batch normalization for the one or more vectors.

Example 23 may include the at least one computer readable storage medium of any of Examples 20 to 22, comprising a further set of instructions, which when executed by the computing device, cause the computing device to accumulate a running value corresponding to a square root of the sum of squares operation.

Example 24 may include the at least one computer readable storage medium of Example 23, comprising a further set of instructions, which when executed by the computing device, cause the computing device to determine a number of elements for the sum of squares operation based on a threshold value relative to a maximum fixed-point value, and accumulate the running value corresponding to a square root of the sum of squares operation based on the determined number of elements.

Example 25 may include the at least one computer readable medium storage medium of any of Examples 20 to 24, wherein the multi-layer neural network is further to provide one or more of supervised and unsupervised learning for one or more of a speech processing application, an image processing, a pattern processing application, and a machine learning application.

Example 26 may include a machine learning apparatus, comprising means for processing one or more vectors with a sum of squares operation with a layer of a multi-layer neural network, and means for determining a fixed-point approximation for the sum of squares operation.

Example 27 may include the apparatus of Example 26, further comprising means for providing overflow protection for the sum of squares operation.

Example 28 may include the apparatus of any of Examples 26 to 27, further comprising means for providing batch normalization for the one or more vectors.

Example 29 may include the apparatus of any of Examples 26 to 28, further comprising means for accumulating a running value corresponding to a square root of the sum of squares operation.

Example 30 may include the apparatus of Example 29, further comprising means for determining a number of elements for the sum of squares operation based on a threshold value relative to a maximum fixed-point value, and means for accumulating the running value corresponding to a square root of the sum of squares operation based on the determined number of elements.

Example 31 may include the apparatus of any of Examples 26 to 30, wherein the multi-layer neural network is further to provide one or more of supervised and unsupervised learning for one or more of a speech processing application, an image processing, a pattern processing application, and a machine learning application.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A multi-layer neural network apparatus, comprising:
a first computational layer; and
a second computational layer communicatively coupled to the first computational layer, wherein one or more of the first and second computational layers include computational logic implemented in one or more of configurable logic or fixed-functionality logic hardware to:
process one or more vectors with a sum of squares operation;
iteratively sum squares of first elements of the one or more vectors until a square of a current element of the first elements during a current iteration exceeds a threshold value, wherein the summation of squares of the first elements is to generate a first value;
iteratively sum squares of second elements of the one or more vectors, wherein the second elements are different from the first elements, wherein the summation of squares of the second elements is to generate a second value;
determine a fixed-point approximation for the sum of squares operation based on the first value and the second value so as to determine the fixed-point approximation with a fixed-point logic circuit that is to bypass one or more overflow operations; and
provide one or more of supervised learning or unsupervised learning for a machine learning application based at least in part on the fixed-point approximation.

2. The apparatus of claim 1, wherein the computational logic is further to:
provide overflow protection for the sum of squares operation.

3. The apparatus of claim 1, wherein the computational logic is further to:
provide batch normalization for the one or more vectors.

4. The apparatus of claim 1, wherein the computational logic is further to:
accumulate a running value corresponding to a square root of the sum of squares operation.

5. The apparatus of claim 1, wherein the machine learning application is associated with one or more of a speech processing application, an image processing application or a pattern processing application.

6. The apparatus of claim 1, wherein the fixed-point logic circuit includes fixed point arithmetic logic.

7. A semiconductor package apparatus, comprising:
one or more substrates; and
logic coupled to the one or more substrates, wherein the logic is at least partly implemented in one or more of configurable logic or fixed-functionality logic hardware, the logic coupled to the one or more substrates to:
process one or more vectors with a sum of squares operation with a layer of a multi-layer neural network,
iteratively sum squares of first elements of the one or more vectors until a square of a current element of the first elements during a current iteration exceeds a threshold value, wherein the summation of squares of the first elements is to generate a first value;
iteratively sum squares of second elements of the one or more vectors, wherein the second elements are different from the first elements, wherein the summation of squares of the second elements is to generate a second value;
determine a fixed-point approximation for the sum of squares operation based on the first value and the second value so as to determine the fixed-point approximation with a fixed-point logic circuit that is to bypass one or more overflow operations, wherein the multi-layer neural network is further to provide one or more of supervised learning or unsupervised learning for a machine learning application based at least in part on the fixed-point approximation.

8. The apparatus of claim 7, wherein the logic is further to:
provide overflow protection for the sum of squares operation.

9. The apparatus of claim 7, wherein the logic is further to:
provide batch normalization for the one or more vectors.

10. The apparatus of claim 7, wherein the logic is further to:
accumulate a running value corresponding to a square root of the sum of squares operation.

11. The apparatus of claim 7, wherein the machine learning application is associated with one or more of a speech processing application, an image processing, or a pattern processing application.

12. The apparatus of claim 7, wherein the logic coupled to the one or more substrates includes transistor channel regions that are positioned within the one or more substrates.

13. The apparatus of claim 7, wherein the fixed-point logic circuit includes fixed point arithmetic logic.

14. A method of machine learning, comprising:
processing one or more vectors with a sum of squares operation with a layer of a multi-layer neural network;
iteratively summing squares of first elements of the one or more vectors until a square of a current element of the first elements during a current iteration exceeds a threshold value, wherein the summing of squares of the first elements generates a first value;
iteratively summing squares of second elements of the one or more vectors, wherein the second elements are different from the first elements, wherein the summing of squares of the second elements generates a second value; and
determining a fixed-point approximation for the sum of squares operation based on the first value and the second value so as to determine the fixed-point approximation with a fixed-point logic circuit that is to bypass one or more overflow operations, wherein the multi-layer neural network further provides one or more of supervised learning or unsupervised learning for a machine learning application based at least in part on the fixed-point approximation.

15. The method of claim 14, further comprising:
providing overflow protection for the sum of squares operation.

16. The method of claim 14, further comprising:
providing batch normalization for the one or more vectors.

17. The method of claim 14, further comprising:
accumulating a running value corresponding to a square root of the sum of squares operation.

18. The method of claim 14, wherein the machine learning application is associated with one or more of a speech processing application, an image processing, or a pattern processing application.

19. At least one non-transitory computer readable storage medium, comprising a set of instructions, which when executed by a computing device, cause the computing device to:
process one or more vectors with a sum of squares operation with a layer of a multi-layer neural network;
iteratively sum squares of first elements of the one or more vectors until a square of a current element of the first elements during a current iteration exceeds a threshold value, wherein the summation of squares of the first elements is to generate a first value;

iteratively sum squares of second elements of the one or more vectors, wherein the second elements are different from the first elements, wherein the summation of squares of the second elements is to generate a second value; and determine a fixed-point approximation for the sum of squares operation based on the first value and the second value so as to determine the fixed-point approximation with a fixed-point logic circuit that is to bypass one or more overflow operations, wherein the multi-layer neural network is further to provide one or more of supervised learning or unsupervised learning for a machine learning application based at least in part on the fixed-point approximation.

20. The at least one non-transitory computer readable storage medium of claim 19, comprising a further set of instructions, which when executed by the computing device, cause the computing device to:

provide overflow protection for the sum of squares operation.

21. The method of claim 14, wherein the fixed-point logic circuit includes fixed point arithmetic logic.

22. The at least one non-transitory computer readable storage medium of claim 19, comprising a further set of instructions, which when executed by the computing device, cause the computing device to:

provide batch normalization for the one or more vectors.

23. The at least one non-transitory computer readable storage medium of claim 19, comprising a further set of instructions, which when executed by the computing device, cause the computing device to:

accumulate a running value corresponding to a square root of the sum of squares operation.

24. The at least one non-transitory computer readable storage medium of claim 19, wherein the machine learning application is associated with one or more of a speech processing application, an image processing, or a pattern processing application.

25. The at least one non-transitory computer readable storage medium of claim 19, wherein the fixed-point logic circuit includes fixed point arithmetic logic.

* * * * *